United States Patent
Martincic

(10) Patent No.: US 11,379,369 B1
(45) Date of Patent: Jul. 5, 2022

(54) SYSTEMS AND METHODS FOR DYNAMIC IN-MEMORY CACHING OF MAPPINGS INTO PARTITIONS

(71) Applicant: Coupang Corp., Seoul (KR)

(72) Inventor: Fernando Martincic, Seattle, WA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/149,791

(22) Filed: Jan. 15, 2021

(51) Int. Cl.
  *G06Q 30/00* (2012.01)
  *G06F 12/0813* (2016.01)
  *G06F 9/50* (2006.01)
  *G06Q 30/06* (2012.01)
  *G06Q 20/38* (2012.01)

(52) U.S. Cl.
  CPC ........ *G06F 12/0813* (2013.01); *G06F 9/5083* (2013.01); *G06Q 20/387* (2013.01); *G06Q 30/0643* (2013.01); *G06F 2212/254* (2013.01)

(58) Field of Classification Search
  CPC ............... G06F 12/0813; G06F 9/5083; G06F 2212/254; G06Q 20/387; G06Q 30/0222; G06Q 30/0643
  See application file for complete search history.

(56) References Cited

U.S. PATENT DOCUMENTS

| | | | |
|---|---|---|---|
| 10,225,341 B2 | 3/2019 | Howard et al. | |
| 2006/0089849 A1* | 4/2006 | Irby | G07F 9/02 705/400 |
| 2008/0235150 A1 | 9/2008 | Lotan et al. | |
| 2009/0055828 A1* | 2/2009 | McLaren | G06Q 30/02 718/103 |
| 2009/0313436 A1* | 12/2009 | Krishnaprasad | G06F 12/0813 711/129 |
| 2018/0248946 A1* | 8/2018 | Howard | H04L 67/1095 |
| 2018/0260338 A1* | 9/2018 | Krishnappa | G06F 12/12 |

(Continued)

FOREIGN PATENT DOCUMENTS

| | | |
|---|---|---|
| EP | 1736899 B1 | 4/2012 |
| JP | 2012-504262 | 2/2012 |

(Continued)

OTHER PUBLICATIONS

S. Das and A. Banerjee, "An arbitration on cache replacements based on frequency—Recency product values," 2016 International Conference on VLSI Systems, Architectures, Technology and Applications (VLSI-SATA), 2016, pp. 1-6, doi: 10.1109/VLSI-SATA.2016.7593031. (Year: 2016).*

(Continued)

*Primary Examiner* — Sun M Li
(74) *Attorney, Agent, or Firm* — Finnegan, Henderson, Farabow, Garrett & Dunner LLP

(57) ABSTRACT

Systems and methods for routing requests to dynamically cached mappings are disclosed. A system may comprise a memory storing instructions and at least one processor configured to execute instructions to perform operations including: receiving an access request to access first item data from a user device, the access request having an access key; based on the access key, routing the request to a server having an in-memory cache with multiple partitions associated with different access key types and storing the first item data and second item data; receiving, from the server, the first item data; and transmitting the first item data to the user device.

19 Claims, 10 Drawing Sheets

(56) References Cited

U.S. PATENT DOCUMENTS

| | | | |
|---|---|---|---|
| 2019/0173976 A1 | 6/2019 | Bendapudi et al. | |
| 2020/0167241 A1* | 5/2020 | Higuchi | H04W 4/44 |
| 2020/0234325 A1* | 7/2020 | Hoque | G06Q 20/401 |
| 2020/0322139 A1 | 10/2020 | Hersans et al. | |

FOREIGN PATENT DOCUMENTS

| | | |
|---|---|---|
| KR | 10-1790701 | 11/2017 |
| KR | 10-2019-0038561 | 4/2019 |

OTHER PUBLICATIONS

PCT Notification, International Search Report, and Written Opinion in counterpart PCT/IB2021/050877 dated Oct. 13, 2021 (12 pages).
Notice of Preliminary Rejection in counterpart Korean Application No. 10-2021-0149974 dated May 19, 2022 (10 pages).

* cited by examiner

SYSTEMS AND METHODS FOR DYNAMIC IN-MEMORY CACHING OF MAPPINGS INTO PARTITIONS

TECHNICAL FIELD

Exemplary embodiments generally relate to systems and methods for dynamically caching mappings into partitions. For example, disclosed techniques may include generating a mapping of an access key to item data based on a received request. Some techniques may include partitioning a cache according to different types of access keys.

BACKGROUND

In many situations, such as online marketplaces, inventory management, or repair part database management, current systems may receive a request from an entity to access or generate information related to item data. In some cases, item data may be generated and stored in a database, which may store item data related to tens of thousands of items or more. Then, a user may transmit a request to the database to access particular information. However, e-commerce websites and related infrastructure struggle to manage such vast amounts of data while still remaining timely and reliable (e.g., not crashing).

With so much item information stored in the database, it can become inundated with requests, as thousands of users seek to access various portions of data. This can lead to numerous problems within the system, included overload of that database, causing it to crash or otherwise not function. In some cases, while the database may continue to function, request response time may significantly decrease, leading to a noticeably higher latency period between a user transmitting a request and receiving information. Moreover, in many cases, conventional databases store data on media that may not have read times that are as fast as other media. However, storing vast amounts of item data on fast-read-time media could be cost prohibitive.

In view of these deficiencies of current item data management systems, there is a need for improved systems and methods for dynamically caching mappings into partitions and routing requests to the mappings, to allow for faster response times while simultaneously reducing strain on system resources without requiring purchasing prohibitively expensive amounts of superior hardware, for example. The disclosed system and methods address one or more of the problems set forth above and/or other problems in the prior art.

SUMMARY

Consistent with the present embodiments, one aspect of the present disclosure is directed to a system for routing requests to dynamically cached mappings. The system may comprise a non-transitory computer-readable medium containing a set of storing instructions and at least one processor configured to execute instructions to perform steps. These steps may comprise: receiving an access request to access first item data from a user device, the access request having an access key; based on the access key, routing the request to a server having an in-memory cache with multiple partitions associated with different access key types and storing the first item data and second item data; receiving, from the server, the first item data; and transmitting the first item data to the user device.

In another embodiment, the server is part of a network of servers and the in-memory cache is part of a distributed cache distributed across the network of servers.

In another embodiment, the server is configured to remove at least one of the first or second item data in response to receiving third item data.

In another embodiment, the distributed cache is distributed across the network of servers using a load balancer.

In another embodiment, the distributed cache is partitioned according to a plurality of access key types.

In another embodiment, the access key types are associated with different data access churn rates.

In another embodiment, sizes of the distributed cache partitions are associated with the different data access churn rates.

In another embodiment, the server stores the first item data at the in-memory cache; and the server is configured to determine the first item data based on the received access key and a mapping between the received access key and the first item data.

In another embodiment, the first item data is associated with mappings to multiple access keys having different access key types.

In another embodiment, the access key type is determined from among a plurality of access key types based on a combination of item identifiers selected at the user device.

In another embodiment, the access key type is determined from among a plurality of access key types based on determining a promotion based on the combination of item identifiers selected at the user device.

In another embodiment, the promotion is determined to provide a maximum discount.

In another embodiment, the steps may further comprise: receiving a mapping request from a source device, the mapping request comprising mapping request data associated with the first item data; generating, based on the mapping request, the access key and the first item data; mapping the access key to the first item data; and storing the first item data at the server or a database, the server being communicably connected to the database.

In another embodiment, the steps may further comprise: generating, based on the mapping request, at least one additional access key and additional item data; mapping the at least one additional access key to the additional item data; and storing the additional item data at the server or a database.

In another embodiment, the request data comprises a plurality of promotion types; the access key and item data are associated with a first promotion type; and the additional access key and additional item data are associated with a second promotion type.

In another embodiment, the item identifiers are associated with a group of items in a virtual shopping cart.

In another embodiment, the first item data comprises data associated with a promotion for at least one of the items.

In another embodiment, the server is configured to remove the first or second item data at a predetermined time from when the first or second item was stored on the server.

Yet another aspect of the present disclosure is directed to a computer-implemented method for dynamically caching mappings. The method may comprise receiving an access request to access first item data from a user device, the access request having an access key; based on the access key, routing the request to a server having an in-memory cache with multiple partitions associated with different access key types and storing the first item data and second item data; receiving, from the server, the first item data; and transmitting the first item data to the user device.

Yet another aspect of the present disclosure is directed to a system for dynamically caching mappings. The system may comprise a group of networked servers, a computing device, a load balancer, and a server. The computing device may comprise at least one processor and a non-transitory computer-readable medium containing a set of instructions that, when executed by the at least one processor, cause the at least one processor to perform steps, which may comprise: receiving a mapping request from a remote source device, the mapping request comprising a reduction parameter associated with a price of a first item; generating, based on the mapping request, the access key and first item data; mapping the access key to the first item data; receiving an access request to access first item data from a user device, the access request having an access key, the access key having an access key type; based on the access key, routing the access request to a load balancer; receiving, from a server, the first item data; and transmitting the item data to the user device. The load balancer may comprise at least one processor and a non-transitory computer-readable medium containing a set of instructions that, when executed by the at least one processor, cause the at least one processor to perform steps comprising: receiving the access request from the computing device and routing the access request to the server based on access request loads of the networked servers. The server may comprise an in-memory cache with multiple partitions associated with different access key types, the in-memory cache storing the first item data and second item data; at least one processor; and a non-transitory computer-readable medium containing a set of instructions that, when executed by the at least one processor, cause the processor to perform steps comprising: receiving the access request from the load balancer; determining a partition associated with the access key type of the access key; and retrieving, from the partition and using the access key, the first item data, wherein the server is configured to remove at least one of the first or second item data in response to receiving third item data.

Consistent with other disclosed embodiments, exemplary embodiments of non-transitory computer readable storage media may store program instructions, which may be executed by at least one processor device and perform any of the methods described herein.

The foregoing general description and the following detailed description provide exemplary embodiments and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1A:
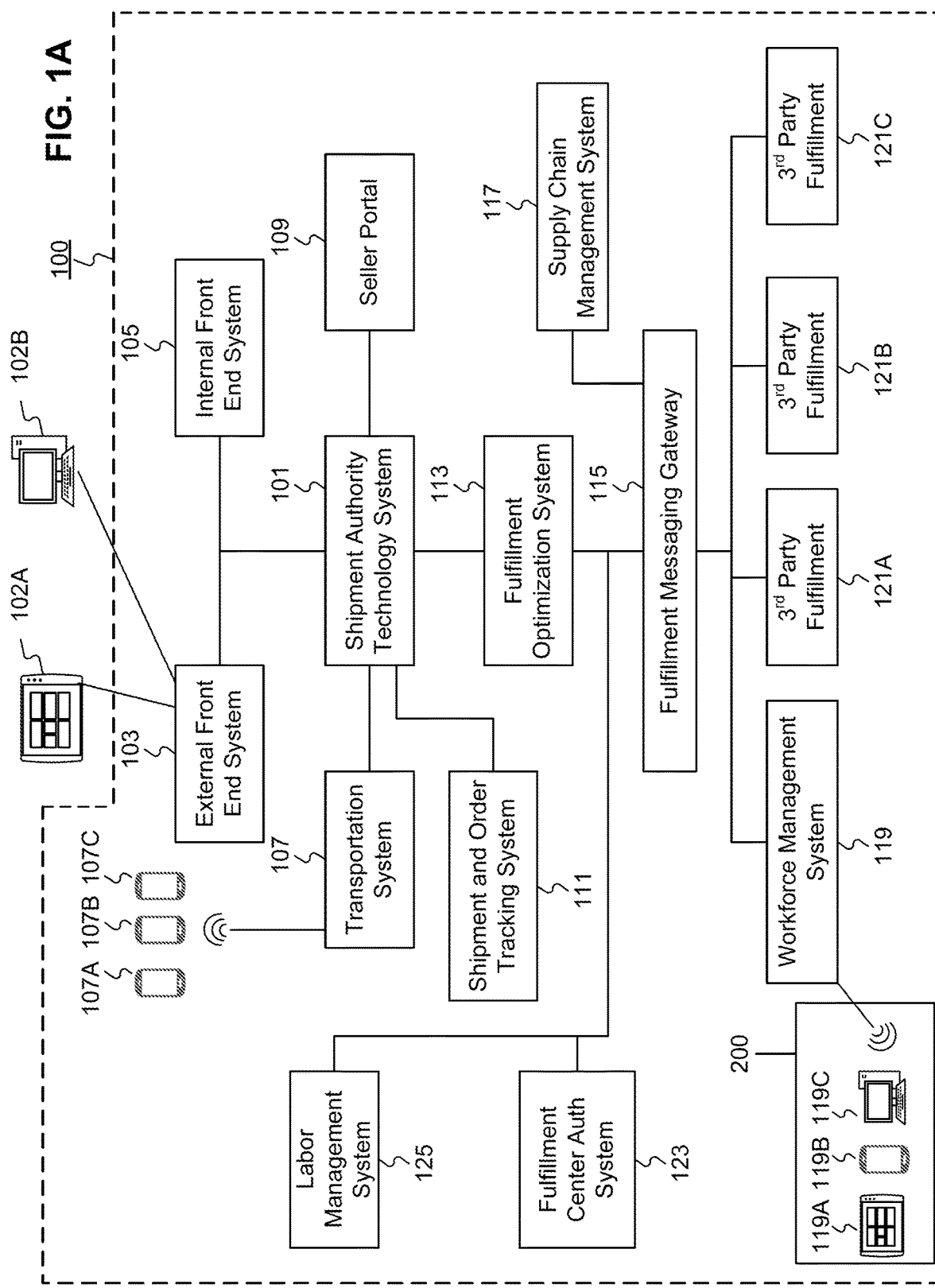
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Detail Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

The disclosure is generally directed to automated systems and processes for coordinating the analysis, transmission, and management of generating and dynamically caching mappings.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
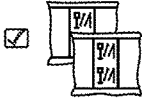
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured)

operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3rd party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
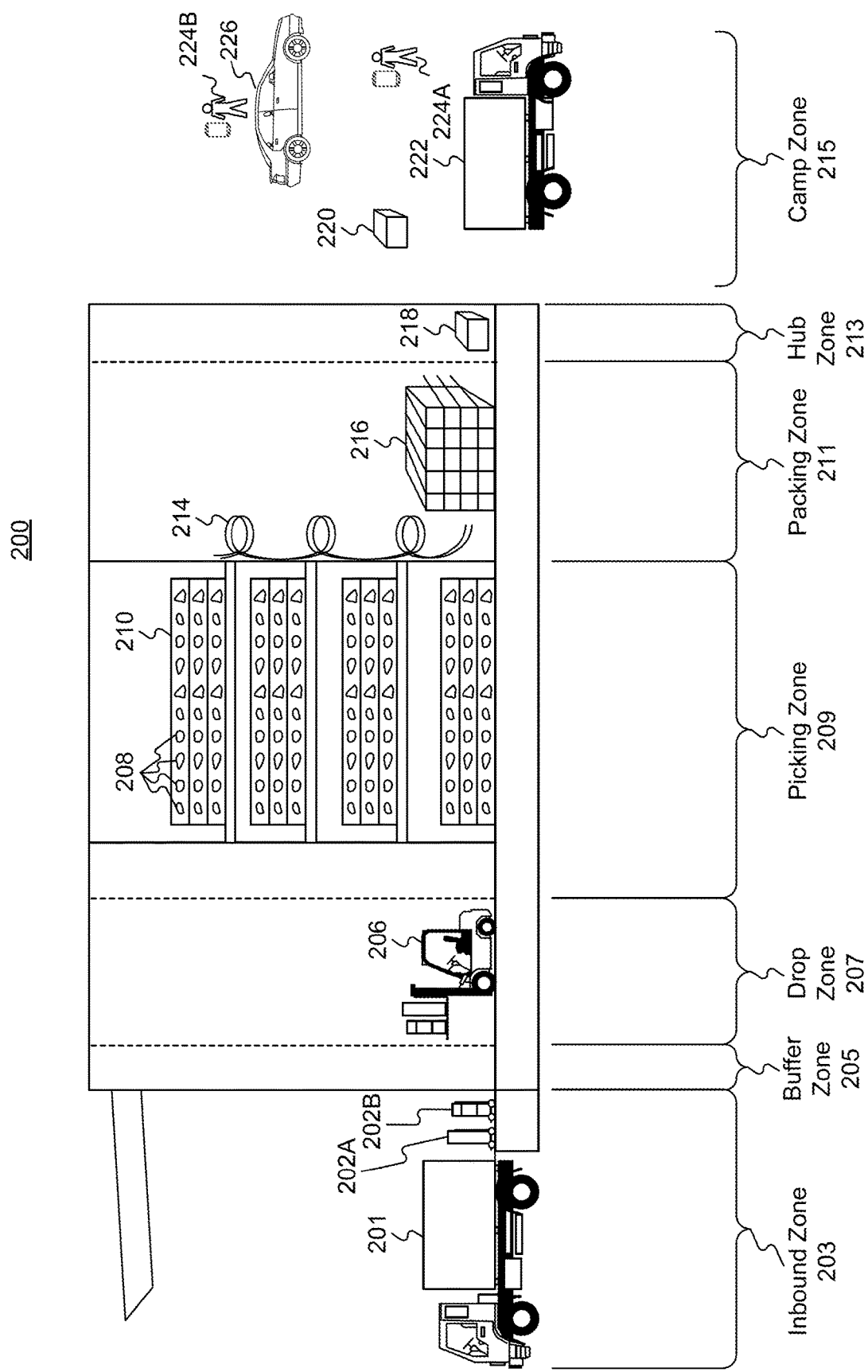
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1196.

Once a user places an order, a picker may receive an instruction on device 1196 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
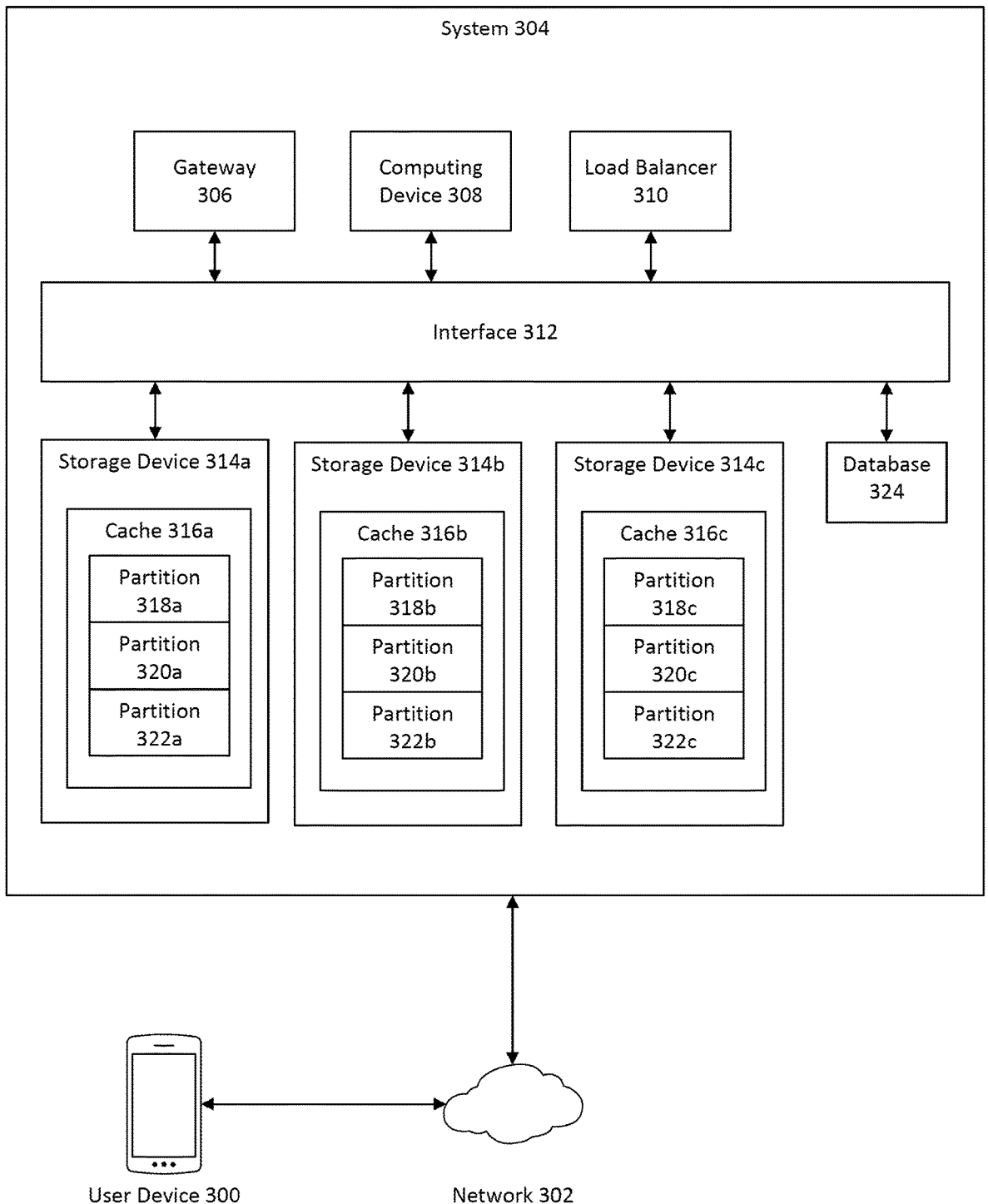
FIG. 3 illustrates an exemplary pictographic representation of a system architecture for routing requests to dynamically cached mappings, consistent with disclosed embodiments.

FIG. 3 illustrates an exemplary pictographic representation of a system architecture 30 for routing requests to dynamically cached mappings, consistent with disclosed embodiments. System architecture 30 may include a user device 300, which may be an instance of a computing device 400. User device 300 may be associated with a user attempting to access cached data, generate order request data (e.g., application program interface (API) data for ordering an item), transmit order request data, and/or request information related to an item promotion. In some embodiments, user device 300 (e.g., mobile device 102A, computer 102B mobile device 119A, mobile device 1196, or mobile device 119C) may be associated with an administrator associated with system 304. In some embodiments, functionality described with respect to one device may be carried out by another device (e.g., functions described with respect to computing device 308 and a storage device 314 may be carried out by one device).

System architecture 30 may also include a network 302, which may communicably link different devices (e.g., user device 300 and system 304). Network 302 may be a public network or private network and may include, for example, a wired or wireless network, including, without limitation, a Local Area Network (LAN), a Wide Area Network (WAN), a Metropolitan Area Network, an IEEE 802.11 wireless network (e.g., "Wi-Fi"), a network of networks (e.g., the Internet), a land-line telephone network, the like, or any combination thereof. Network 302 may be connected to other networks (not depicted in FIG. 3) to connect the various system components to each other and/or to external systems or devices. In some embodiments, network 302 may be a secure network and require a password to access the network.

System architecture 30 may also include system 304, which may be associated with an online marketplace host, software support entity, computational support entity, and/or networking support entity. System 304 may include a gateway 306 (e.g., an API gateway), computing device 308, load balancer 310, interface 312, and storage devices 314a, 314b, and 314c. In some embodiments, system 304 may include, or may be communicably connected to (e.g., through network 302) other components discussed herein, such as a portion or all of system 100 (e.g., WMS 119, which may transmit inventory information to parts of system 304). Any or all of these devices may be communicably coupled by at least one network interface (e.g., interface 312, which may be an instance of a network 302). In some embodiments, system 304 may include a group of networked servers (e.g., storage devices 314). System 304 may include a gateway 306, which may receive and route access requests (e.g., API calls) incoming and outgoing to and from system 304. For example, gateway 306 may route information to and from computing device 308, which may implement a first API, and may route information to and from storage device 314b, which may implement a second API. For example, user device 300 may connect to gateway 306 wirelessly, such as through a network (e.g., an instance of network 302, described below), and communicate with devices of system 304. Gateway 306 may include a server, a router, a switch, an adapter, a group of networked devices, network interface, or other computing device. In some embodiments, gateway 306 may operate using a mobile Application Program Interface (MAPI), according to which it may transmit and/or receive communications. In some embodiments, gateway 306 may include a synchronous request controller and/or asynchronous request controller, which may allow a user device to perform asynchronous requests to generate a mapping, access cached data, etc. By being configured for asynchronous requests, gateway 306 may perform operations to complete a request from a user device (e.g., user device 300), while allowing the user device to continue performing operations. Moreover, gateway 306 may be configured to receive a request from a user device while performing operations to satisfy an earlier received request.

System 304 may also include a computing device 308, which may be an instance of computing device 400, discussed below. In some embodiments, computing device 308 may implement an API to generate a mapping, route an access request, cache data, partition data, and/or perform any other operation described with respect to the methods discussed herein. Computing device 308 may be a general-purpose computer, a special purpose computer, a server, a cloud-based device, a mobile device, or any other device capable of performing one of the steps discussed herein.

System 304 may also include load balancer 310, which may be configured to balance loads (e.g., route incoming and outgoing transmissions) across multiple devices, such as storage devices 314a, 314b, and/or 314c. In some embodiments, load balancer 310 may balance loads across multiple devices according to one or more load balancing algorithms (e.g., a round robin algorithm, a weighted round robin algorithm, a least connections algorithm, a least response time algorithm, etc.). In some embodiments, load balancer 310 may be integrated with computing device 308.

System 304 may also include an interface 312, which may communicably couple devices within system 304. For example, interface 312 may route information between gateway 306 and computing device 308, between computing device 308 and storage device 314c, etc. In some embodiments, interface 312 may include a network (e.g., an instance of network 302), a router, a bridge, a server, a network interface card (a NIC, which may be present on computing device 308, a storage device, and/or any device within system architecture 30). In some embodiments, interface 312 may be implemented wholly or partly within software on a device in system 304, for example as a loopback interface, which may be implemented on computing device 308 or another device.

System 304 may also include a storage device, such as storage device 314, such as a storage device 314a, 314b, and/or 314c. A storage device 314 may be a physical server, virtual server, database, or other device capable of storing data. In some embodiments, a storage device 314 may store mapping request data, access request data, partition data, item data, price determination data, cross-data mapping information, a computerized model, an algorithm, or any other information for partition data, and/or any data for an operation described with respect to the methods discussed herein. Item data may include an item identifier (e.g., model number, Universal Product Code (UPC), Stock Keeping Unit (SKU) number, European Article Number (EAN), Global Trade Item Number (GTIN), International Standard Book Number (ISBN), etc.), item specification (e.g., an item type, dimension, color, version, pattern, appearance, feature, etc.), item manufacturer, and/or any information for identifying an item (e.g., ordered by a user). Item data may also include promotion data, which may include promotion parameters for determining a reduction amount. Promotion data may include an item quantity, a total purchase amount (e.g., a total price of items in a virtual shopping cart), a time period (e.g., a promotional period), a remaining number of items (e.g., a Boolean value indicating whether any of a designated number of promotion items remain in stock, which computing device 308 may determine by communicating with WMS 119), a disqualification parameter (e.g., a prior application of a same promotion), a membership indication (e.g., indicating that a user is a member of a rewards group), any piece of item data identified as a criterion (e.g., parameter) for a promotion, and/or any combination thereof. In some embodiments, storage device 314 may store associations between product data, mappings between product identifiers and promotion identifiers, mappings between cache identifiers and initial reduction amounts, associations between combinations of item identifiers and reduction amounts, etc. Storage device 314 may include a cloud-based database (e.g., a Relational Database Service (RDS)) or an on-premises database. Storage device 314 may include data received from one or more components of system 304 and/or computing components outside system 304 (e.g., via network 302).

In some embodiments, storage device 314 may include a cache 316, which may store cached data related to a user device 300 and/or an order request. For example, storage device 314a may include a cache 316a, storage device 314b may include a cache 316b, and storage device 314c may include a cache 316c. In some embodiments, a cache 316 may be part of a memory component, such as a hard disk, a random access memory (RAM), a read-only memory (ROM), an erasable programmable read-only memory (EPROM or Flash memory), and the like. In some embodiments, a storage device 314 may include multiple storage components, such as a hard disk and a Flash memory, both of which may or may not have a partitioned cache. In some embodiments, a cache 316 may store a cache identifier, an access key, a reduction amount (e.g., a computed reduction amount), order data (e.g., initial order data), mapping data (e.g., data linking an access key to a reduction amount and/or promotion parameters), or any other information related to generating mappings, caching data, and/or routing access requests. In some embodiments, storage device 314 may dynamically change the size of cache 316 based on present demand for cache resources. In some embodiments, cache 316 may exist on another device other than storage device 314, such as computing device 308. In some embodiments, multiple caches (e.g., cache 316a, cache 316b, and cache 316c) may form a distributed cache across multiple devices (e.g., storage devices 314a, 314b, and 314c). A distributed cache may include a segmented form (e.g., with cache 316a having a portion of a dataset and cache 316b having a different portion) and/or a duplicated form of a dataset (e.g., same data being stored at multiple caches).

In some embodiments, a cache may have multiple partitions. For example, cache 316a may include partitions 318a, 320a, and 322a, cache 316b may include partitions 318b, 320b, and 322b, and cache 316c may include partitions 318c, 320c, and 322c. In some embodiments, some or all of partitions within a cache may be equally sized or differently sized. For example, a cache may be partitioned according to a plurality of access key types, such that a partition is associated with one or more access key types. In some embodiments, an access key type may be based on a particular mapping combination, such as a particular promotion (e.g., reduction amount) mapped to a particular item (e.g., a promotion-item mapping), a promotion-category mapping, a promotion-sub-category mapping, a promotion-vendor mapping, a promotion-vendor-specific-item mapping, etc. Additionally or alternatively, an access key type may be based on parameters included in a mapping request (e.g., vendor-specific parameters). In some embodiments, a partition may be modified (e.g., enlarged or shrunk), deleted, and/or added to a cache dynamically, such as based on a number of access keys, a number of access key types, an access key type, an access key usage frequency, an access key age (e.g., time since generation of the access key), a promotion type, an item data type, a remote entity request (e.g., to add or remove a mapping), and/or an action taken by a user (e.g., at computing device 308, user device 300, etc.). In some embodiments, a computing device may size a cache partition based on a churn rate (e.g., a rate at which data elements are replaced in the cache, a frequency with which data is access in the cache). In some embodiments, system 304 may also include at least one database 324, which may also store item data, which may be retrieved by another device (e.g., computing device 308 or a storage device 314). In some embodiments, database 324 may be a storage device 314 that includes a hard disk and/or does not have a cache.

Figure 4:
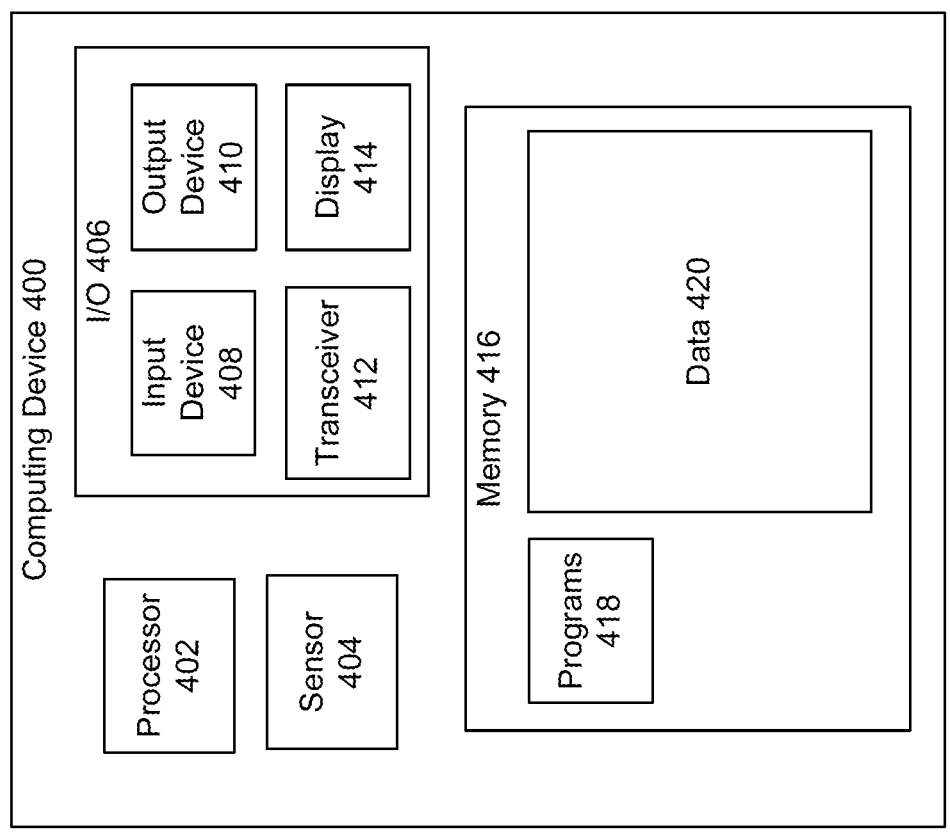
FIG. 4 illustrates an exemplary pictographic representation of a computing device for routing requests to dynamically cached mappings, consistent with disclosed embodiments.

FIG. 4 illustrates an exemplary pictographic representation of computing device 400, which may be configured to carry processes described herein. In some embodiments, computing device 400 may be associated with a user, consumer, online shopper, online marketplace, shipping entity, software developer, company, manufacturer, and/or other entity involved with generating mappings, caching data, and/or routing access requests.

Computing device 400 may include a processor 402, which may include one or more dedicated processing units, application-specific integrated circuits (ASICs), field-programmable gate arrays (FPGAs), graphical processing units, or various other types of processors or processing units coupled with memory 416. Processor 402 may constitute a single-core or multiple-core processor that executes parallel processes simultaneously. For example, processor 402 may be a single-core processor configured with virtual processing technologies. In some embodiments, processor 402 may use logical processors to simultaneously execute and control multiple processes. Processor 402 may implement virtual machine technologies, or other known technologies to provide the ability to execute, control, run, manipulate, store, etc., multiple software processes, applications, programs, etc. In another embodiment, processor 402 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 402 may execute various instructions stored in memory 416 to perform various functions of the disclosed embodiments described in greater detail below. Processor 402 may be configured to execute functions written in one or more known programming languages.

Computing device 400 may also include a sensor 404, which may include an accelerometer, a light sensor, an audio sensor, an infrared sensor, a motion sensor, a piezoelectric sensor, a laser sensor, a sonar sensor, a global positioning system (GPS) sensor, an electromagnetic sensor, and/or the like. In some embodiments, computing device 400 may perform an action based on an input received by sensor 404. For example, computing device 400 may transmit a notification to a display (e.g., display 414) when a sensor 404 (e.g., a motion sensor) determines that computing device 400 is in motion.

Computing device 400 may also include input/output (I/O) 406, which may include at least one of a display 414 (e.g., graphical display, textual display, light-emitting diode (LED) display, liquid crystal display (LCD) display, etc.), an LED, a router, a touchscreen, a keyboard, a microphone, a speaker, a haptic device, a camera, a button, a dial, a switch, a knob, a touch pad, a button, a microphone, a location sensor, an accelerometer, a camera, a fingerprint scanner, a retinal scanner, a biometric input device, an ultrasonic scanner, a transceiver (e.g., transceiver 412), an input device (e.g., input device 408), an output device (e.g., output device 410), or other I/O device to perform methods of the disclosed embodiments. I/O 406 may include components of an interface (e.g., a user interface). I/O 406 may also include a network interface (not shown), which may include at least one of a wired or wireless network card/chip set. For example, input device 408 may include a touch sensor, a mouse, a keyboard, or any device configured to allow for user input to computing device 400. As another example, output device 410 may include a speaker, display, haptic feedback device, or other device configured to produce output from computing device 400 to a user. Transceiver 412 may include a pluggable and/or optical transmission transceiver.

I/O 406 may include a display 414, which may display data or other information associated with the processes described herein. For example, display 414 may include an LCD, in-plane switching liquid crystal display (IPS LCD), LED display, organic light-emitting diode (OLED) display, active-matrix organic light-emitting diode (AMOLED) display, cathode ray tube (CRT) display, plasma display panel (PDP), digital light processing (DLP) display, or any other display capable of connecting to a user device and depicting information to a user. Display 414 may display graphical interfaces, interactable graphical elements, animations, dynamic graphical elements, and any other visual element.

Computing device 400 may also include memory 416, which may be a single memory component, or multiple memory components. Such memory components may include an electronic storage device, a magnetic storage device, an optical storage device, an electromagnetic storage device, a semiconductor storage device, or any suitable combination of the foregoing. For example, memory 416 may include any number of hard disks, random access memories (RAMs), read-only memories (ROMs), erasable programmable read-only memories (EPROMs or Flash memories), and the like. Memory 416 may include one or more storage devices configured to store instructions usable by processor 402 to perform functions related to the disclosed embodiments. Memory 416 may also include any number of programs, applications, application program interfaces (APIs), or any other data, consistent with the disclosed embodiments.

In some embodiments, memory 416 may contain a number of application program interfaces (APIs). Memory 416 may store programs 418, which may include one or more programs (e.g., APIs, processes, modules, code, scripts, or functions) used to perform methods consistent with disclosed embodiments. Programs 418 may be written in one or more programming or scripting languages. Memory 416 may also maintain data 420, which may include data associated with a user account, an application, a particular device, a model, a communication, or any other data related to generating mappings, caching data, and/or routing access requests. Data may be exchanged within a computing device 400 or between devices (e.g., computing device 308 and storage device 314b, a computing device 308 and a user device 300, etc.) in accordance with any number of formats or protocols, including XML, REST, SOAP, JSON, GraphQL, and the like.

Figure 5:
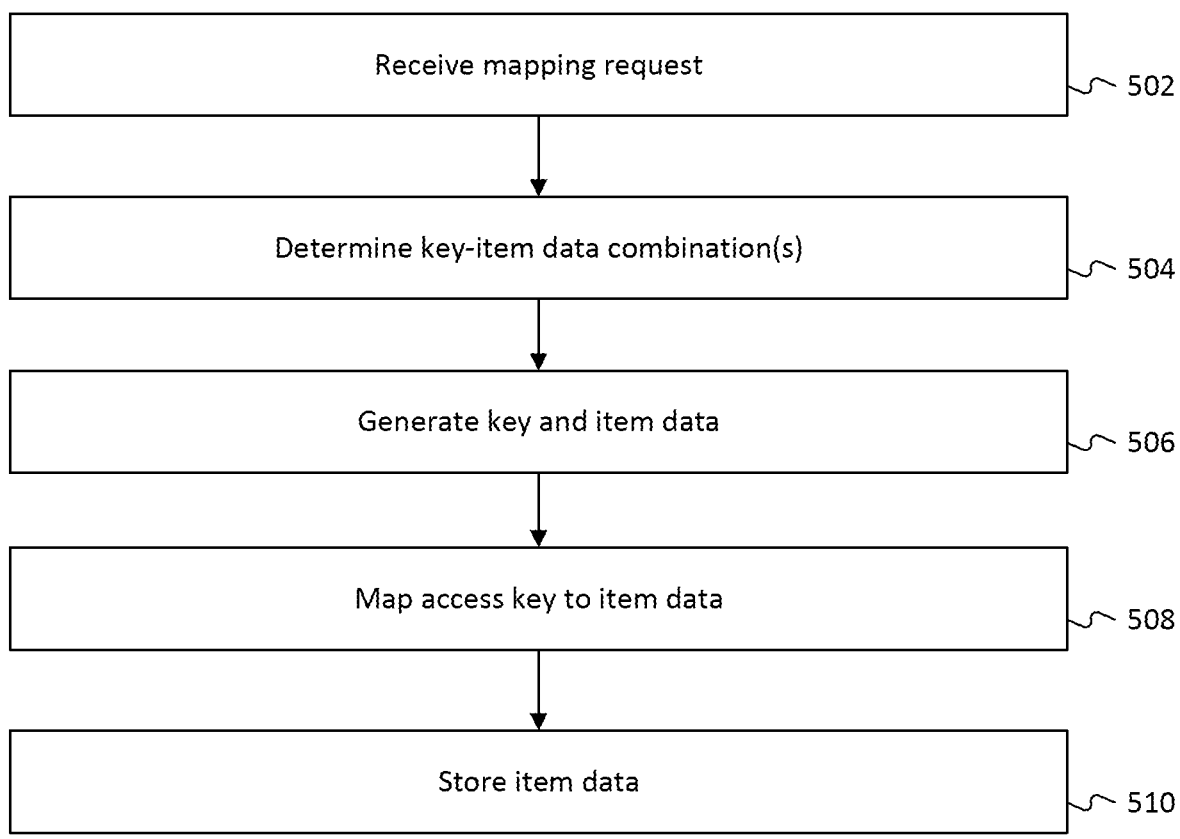
FIG. 5 depicts a flowchart of an exemplary process for generating mappings, consistent with disclosed embodiments.

FIG. 5 depicts a flowchart of an exemplary process 500 for generating mappings, which may be performed by a processor in accordance with disclosed embodiments. For example, process 500 may be performed entirely or in part by computing device 308 (e.g., using processor 402). Alternatively or additionally, some steps of process 500 may be performed by user device 300 and other steps may be performed by another device, such as computing device 308 and/or a storage device 314. While process 500 is described with respect to computing device 308, one of skill will understand that the steps illustrated in FIG. 5 are exemplary and steps may be added, merged, divided, duplicated, repeated, modified, and/or removed in some embodiments.

At step 502, computing device 308 may receive a mapping request, which may be received from a source device (e.g., user device 300), which may be remote from computing device 308. In some embodiments, the mapping request may comprise mapping request data, which may be associated with item data (e.g., first item data). In some embodiments, the request data may comprise one or more promotion types (e.g., a plurality of promotion types). For example, a promotion type may be associated with a promotion associated with (e.g., applicable to, limited to, etc.) particular item data (described with respect to FIG. 3), such as, for instance, an item identifier and/or a total purchase amount. In some embodiments, the mapping request may comprise a reduction parameter associated with a price of first item data.

At step 504, computing device 308 may determine at least one key-item data combination. For example, computing device 308 may determine a pairing between a key and item data (e.g., promotion data). In some embodiments, computing device 308 may determine an association between the mapping request and item and/or promotion data, such as an item identifier (e.g., a model number), an item type identifier, a time period, an item quantity, a reduction amount, an item combination, a membership identifier, a user action indicator (e.g., an indication that a user has clipped a virtual coupon), a manufacturer identifier, a seller identifier, a shipping type, or any other data associated with an item and/or promotion. In some embodiments, computing device 308 may determine multiple key-item data combinations. For example, computing device 308 may determine a number of order request data combinations that satisfy eligibility criteria for a promotion according to data received as part of the mapping request (e.g., promotion parameters).

At step 506, computing device 308 may generate, based on the mapping request, an access key and/or first item data (e.g., promotion data, promotion parameters, eligible order request data combinations, etc.). In some embodiments the access key and first item data may be associated with a first promotion type. In some embodiments, computing device 308 may generate, based on the mapping request, at least one additional access key and/or additional item data. For example, computing device 308 may have determined multiple key-item data combinations at step 504, and may generate an additional access key and/or item data for each key-item data combination. By way of example, computing device 308 may determine a number of order request data combinations that satisfy eligibility criteria for a promotion (e.g., at step 504) and may map the order request data combinations (e.g., a type of item data) to the same access key. In some embodiments, an additional access key and additional item data may be associated with a second promotion type.

At step 508, computing device 308 may map the access key to the first item data. In some embodiments, such as embodiments where computing device 308 generated multiple access keys and/or item data (e.g., promotion data), computing device 308 may map at least one additional access key to additional item data.

At step 510, computing device 308) may store the first item data at a server (e.g., computing device 308, storage device 314) or a database (e.g., storage device 314). In some embodiments, the server may be communicably connected to the database. In some embodiments, such as embodiments where computing device 308 generated multiple access keys and/or item data (e.g., promotion data), computing device 308 may store the additional item data at a server or a database.

Figure 6:
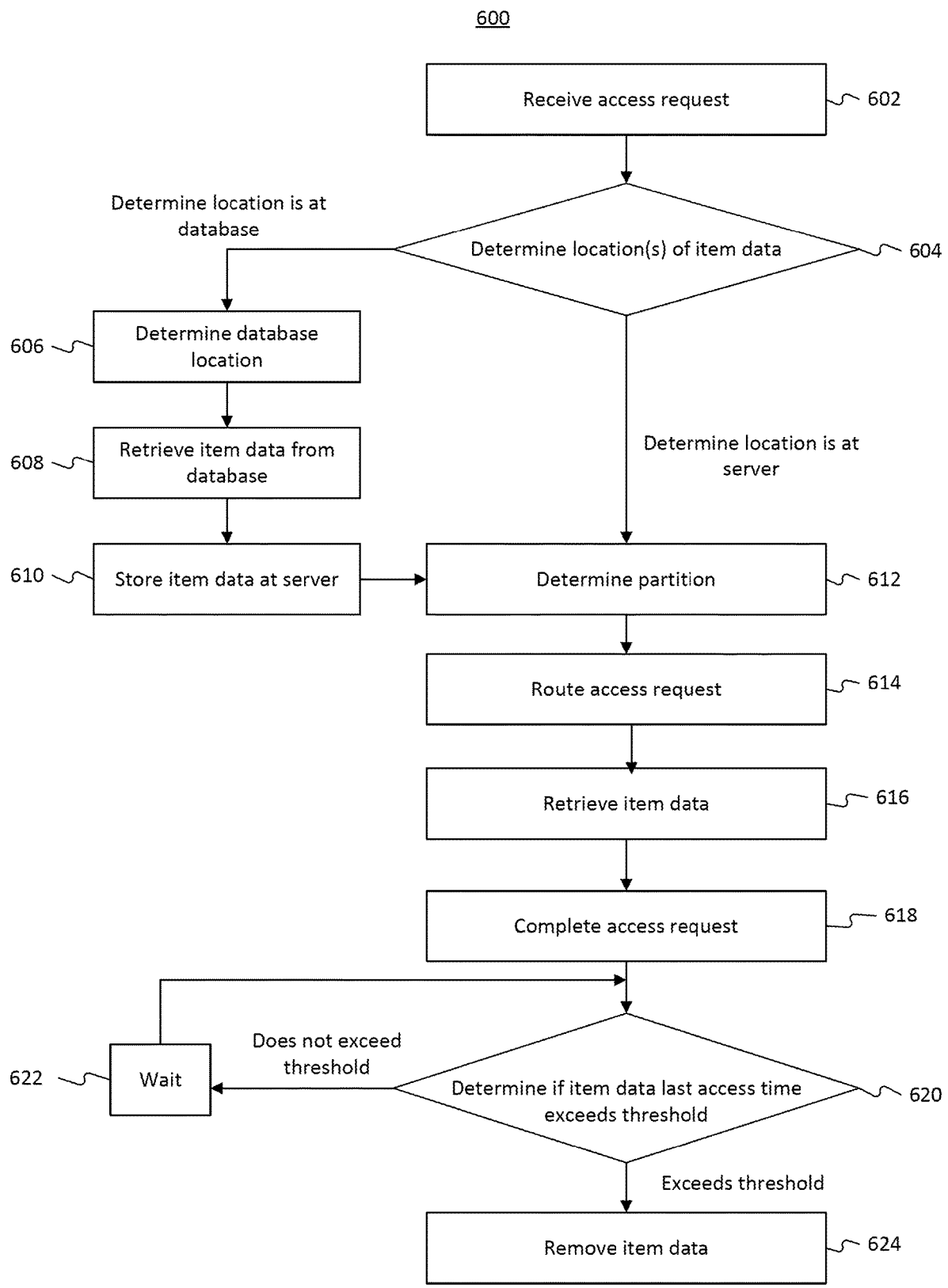
FIG. 6 depicts a flowchart of an exemplary process for routing requests to dynamically cached mappings.

FIG. 6 depicts a flowchart of an exemplary process 600 for routing requests to dynamically cached mappings, which may be performed by a processor in accordance with disclosed embodiments. For example, process 600 may be performed entirely or in part by computing device 308 (e.g., using processor 402). Alternatively or additionally, some steps of process 600 may be performed by user device 300 and other steps may be performed by another device, such as a storage device 314 (which may be a server). While process 600 is described with respect to computing device 308, one of skill will understand that the steps illustrated in FIG. 6 are exemplary and steps may be added, merged, divided, duplicated, repeated, modified, and/or removed in some embodiments. In some embodiments, process 600 may be implemented using a service that may be distributed across multiple devices (e.g., multiple storage devices 314).

At step 602, computing device 308 may receive an access request to access first item data. In some embodiments, the access request may be transmitted from a user device 300 and/or may have an access key (e.g., generated according to process 500). As an example, mobile device 102A or computer 102B may transmit an access request, which may be received by external front end system 103, which may be routed to fulfillment optimization system 113 (which, in some embodiments, may include system 304). In some embodiments, the access request may be a request to access discount information associated with one or more items. In some embodiments, a user device 300 (e.g., using an application) may transmit an access request asynchronously (e.g., to an asynchronous queue at system 304), such that the user device may continue to operate different aspects of the application without waiting to receive a response to the access request. In some embodiments, the access key may have an access key type. In some embodiments, the first item data may be associated with mappings to multiple access keys having different access key types (e.g., each access key having a different access key type, some access keys having different access key types, some access keys having the same access key type, etc.). Of course, in other embodiments, the first item data may be associated with a single mapping to an access key having an access key type.

In some embodiments, the access key type (and/or corresponding access key) may be determined from among a plurality of access key types (or access keys) based on a combination of item identifiers selected at the user device. For example, the item identifiers may be associated with a group of items in a virtual shopping cart, which a user may have placed in the virtual shopping cart at user device 300 (e.g., using an application and/or program 418). Additionally, in some embodiments, the access key type (and/or access key) may be determined from among a plurality of access key types (or access keys) based on determining a promotion based on the combination of item identifiers selected at the user device. For example, items in a virtual shopping cart may be associated with different possible promotions (e.g., reduction amounts, coupon, future offer, etc.) associated with different promotion parameter combinations (e.g., a total purchase amount, user membership status, etc.). User device 300, computing device 308, and/or another device may determine a promotion (e.g., reduction amount) from among multiple possibilities, and may determine an access key and/or access key type for the promotion, which may be determined from among other possible access keys or access key types (e.g., access keys or key types associated with different promotions and/or different promotion parameter combinations). In some embodiments, the promotion may be determined to provide a maximum discount (e.g., based on different promotion parameter combinations, which may be determined by a computing device). The selected access key and/or plurality of possible access keys may be associated with an access key type or types, consistent with disclosed embodiments. In some embodiments, the first item data comprises data associated with a promotion for at least one of the items in the virtual shopping cart.

At step 604, computing device 308 may determine at least one location of item data based on the access request. For example, the access request may include an access key that links to one or multiple pieces of item data, which may be stored at one or more storage devices 314 and/or caches 316. In some embodiments, a server (e.g., computing device 308) may be configured to determine first item data based on a received access key and a mapping between the received access key and the first item data. In some embodiments, computing device 308 may determine that a portion or all of the item data exists at a cache 316 (e.g., flash memory on a server). Additionally or alternatively, computing device 308 may determine that a portion or all of the item data exists at a database 324 (e.g., on a hard disk). In some embodiments, if computing device 308 determines that a location of item data is at a database, it may proceed to step 606. Additionally or alternatively, if computing device 308 determines that a location of item data is at a server (e.g., a cache), it may proceed to step 612.

In some embodiments, computing device 308 may route, possibly based on the access key, the access request to a load balancer (e.g., load balancer 310), which in turn may route the access request to a particular device (e.g., storage device 314) based on a load balancing technique. The load balancer may then receive the access request from the computing device 308, and may route the access request to a server based on access request loads of networked servers. The server may then receive the access request from the load balancer. Of course, load balancing operations may take place at any point in process 600 (or other process).

At step 606, computing device 308 may determine a database location. For example, computing device 308 may determine a location on a database 324 of item data. The determination may be based on data included in an access request and/or data determined based on an access request. For example, computing device 308 may determine based on an access key included in the access request that a mapping stored at the database should be retrieved to complete the access request and/or should be stored at a cache.

At step 608, computing device 308 may retrieve item data from the database 324 (e.g., item data stored at a location determined at step 606). In some embodiments, the retrieved item data may not be included on a cache (e.g., flash memory).

At step 610, computing device 308 may store item data (e.g., retrieved at step 608) on a server, such as a storage device 314 (e.g., in a cache, which may be on a flash memory). In some embodiments, after completing step 610, computing device 308 may proceed to step 612. For example, a server (e.g., storage device 314c) may store first item data at an in-memory cache (e.g., cache 316c).

At step 612, computing device 308 may determine a partition having data relevant to an access request. In some embodiments, computing device 308 may determine a partition of a cache on a storage device 314 (e.g., a server) having item data relevant to an access request, some or all of which may have been present on the cache prior to the access request, or some or all of which may have been stored there in response to the access request (e.g., according to steps 602-610). For example, computing device 308 may determine a partition associated with an access key type of an access key (e.g., an access key associated with the access request). In some embodiments, computing device 308 may determine a partition on a cache of a server that is part of a network of servers (e.g., networked through interface 312).

In some embodiments, computing device 308 may access an in-memory cache that is part of a distributed cache (e.g., distributed across the network of servers). In some embodiments, a distributed cache may be distributed across the network of servers using a load balancer. In some embodiments, a distributed cache may be partitioned according to a plurality of access key type (discussed in part with respect to FIG. 4). For example, some or all of the partitions of a distributed cache may be associated with a particular access key type. Additionally or alternatively, access key types may be associated with different data access churn rates (e.g., a rate at how quickly item data in a partition and/or cache changes based on item data being added and removed). For example, users may make access requests with access key types associated with promotion-category mappings much less frequently compared to access requests with access key types associated with promotion-vendor-specific-item mappings. In some embodiments, sizes of the distributed cache partitions may be associated with (e.g., set according to, such as proportionally to) different data access churn rates.

In some embodiments, the server may store first item data (e.g., data associated with a first item, with a first set of items, etc.) and second item data (e.g., data associated with a second item, with a second set of items, etc.). In some embodiments, the server may be configured to remove at least one of the first or second item data in response to receiving third item data. For example, the server may determine that a partition is full, and may determine item data to remove to make space for received item data (e.g., item data received for storage at a server). For example, the server may remove (e.g., delete, move to a database, etc.) item data (e.g., a mapping) having the longest amount of time since last access or storage. As another example, the server may receive a mapping request having third item data (e.g., as discussed with respect to process 500), may determine that the third item data overlaps with or nullifies at least one of the first or second item data, and may remove at least one of the first or second item data in response to the determination. As yet another example, the server may be configured to remove the first or second item data at a predetermined time from when the first or second item was stored on the server.

At step 614, computing device 308 may route the access request, and the routing may be based on an access key, which may have been included as part of the access request. In some embodiments, computing device 308 may route the request to a server (or other storage device) having an in-memory cache with multiple partitions, which may be associated with different access key types.

At step 616, computing device 308 may retrieve item data. For example, computing device 308 may retrieve a key-item mapping and/or other item data based on an access key. For example, computing device 308 may receive, from a server, first item data (examples of which are discussed above). By way of further example, computing device 308 may retrieve, from a partition and using the access key, the first item data.

At step 618, computing device 308 may complete the access request. Completing the access request may comprise querying another device within system 304, querying a user device 300, transmitting order information (e.g., item identifiers, payment account information, shipping information, etc. from a user device 300) to a device and/or system (e.g., WMS 119, mobile device 102A, computer 102B mobile device 119A, mobile device 119B, mobile device 119C, etc.), transmitting error information to a user device 300, transmitting access request and/or order information to a user device 300, and/or transmitting any communication related to the access request. For example, computing device 308 may transmit the first item data, which may include promotion parameters, a reduction amount, or other information associated with a purchase and/or promotion, to a user device 300.

It is appreciated that multiple user devices 300 may make access requests for the same item data or for similar item data, which may lead to multiple user devices 300 accessing the same item data, which may be more quickly accessed from a storage device 314 rather than a database 324. Accordingly, at step 620, a computing device 308 may determine if a prior time at which an item data element was accessed, such as a last access time (the most recent time the data element was accessed), exceeds a threshold. For example, computing device 308 may determine if a last access time for an item data element exceeds ten minutes. If the last access time exceeds the threshold, process 600 may proceed to step 624. If the last access time does not exceed the threshold, process 600 may proceed to step 622. In some embodiments, step 620 may be performed by a storage device (e.g., a storage device 314 may determine a prior time at which an item data element that it stores was accessed).

At step 622, computing device 308 (or other device, such as storage device 314), may wait. In some embodiments, computing device 308 may wait in response to a determination at step 620 that a last access time does not exceed a threshold. For example, computing device 308 may wait until a threshold time, such as a predetermined amount of time following a last access time. In some embodiments, after waiting, computing device 308 may proceed to step 620. In some embodiments, after waiting, computing device 308 may proceed to step 624.

At step 624, computing device 308 may remove item data. For example, computing device 308 may remove item data that is stored on a storage device 314 whose last access time exceeds a threshold. In some embodiments, such as when database 324 does not already store the item data, computing device 308 may remove the item data from a storage device 314 and store the item data on a database 324. In some embodiments, such as when database 324 already stores the item data, computing device 308 may delete the item data from a storage device 314. It is appreciated that, in some embodiments, duplicate item data may be stored at multiple storage devices 314, with some of the item data having different last access times, and thus possibly being removed from their respective storage devices at different times. In some embodiments, a computing device 308 (or other device) may remove item data from a database 324 in response to a removal request from a user device 300. For example, a user device 300 associated with a manufacturer of an item may transmit a request to remove particular promotion data, which may be associated with an item made by the manufacturer, from the database.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer programs based on the written description and methods of this specification are within the skill of a software developer. The various functions, scripts, programs, or modules can be created using a variety of programming techniques. For example, computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages (including an object oriented programming language and/or conventional procedural programming language) such as Smalltalk, C++, JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processor of a general purpose computer, special purpose computer, or other programmable data processing apparatus, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowcharts and block diagrams in the Figures illustrate the architecture, functionality, and operation of possible implementations of systems, methods, and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Moreover, some blocks may be executed iteratively for any number of iterations, and some blocks may not be executed at all. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Moreover, while exemplary embodiments have been described herein, these have been presented for purposes of illustration, but are not intended to be exhaustive or limited to the embodiments disclosed, such that the scope includes any and all embodiments having equivalent elements, modifications, variations, omissions, combinations (e.g., of aspects across various embodiments), adaptations or alterations, without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as examples only, with a true scope and spirit being indicated by the following claims and their full scope of equivalents.

What is claimed is:

1. A system for routing requests to dynamically cached mappings, the system comprising:
    at least one processor; and
    a non-transitory computer-readable medium containing a set of instructions that, when executed by the at least one processor, cause the at least one processor to perform steps comprising:
        receiving, at an asynchronous queue from a user device, an access request to access first item data, the access request having an access key and being generated in response to an action (i) associated with a virtual shopping cart and (ii) taken by the user device;
        based on the access key, routing the access request to a server having an in-memory cache with multiple partitions associated with different access key types, wherein:
            the in-memory cache stores the first item data and second item data;
            the multiple partitions are associated with different frequencies with which data associated with the access key types is replaced; and
            the associated different access key types are associated with the different frequencies with which at least a portion of the first item data or second item data is replaced;
        receiving, from the server, the first item data; and
        transmitting the first item data to the user device.

2. The system of claim 1, wherein the server is part of a network of servers and the in-memory cache is part of a distributed cache distributed across the network of servers.

3. The system of claim 2, wherein the server is configured to remove at least a portion of one of the first or second item data in response to receiving third item data.

4. The system of claim 3, wherein the server is configured to replace the removed data with the third item data after generation of a new mapping for the third item data.

5. The system of claim 1, wherein the access key types are associated with different types of promotion parameter mappings.

6. The system of claim 1, wherein sizes of the partitions are associated with different data access churn rates.

7. The system of claim 1, wherein:
the server stores the first item data at the in-memory cache; and
the server is configured to determine the first item data based on the received access key and a mapping between the received access key and the first item data.

8. The system of claim 7, wherein the first item data is associated with mappings to multiple access keys having different access key types.

9. The system of claim 8, wherein an access key type associated with the access request is determined from among a plurality of access key types based on a combination of item identifiers selected at the user device.

10. The system of claim 9, wherein the access key type is determined from among a plurality of access key types based on determining a promotion based on the combination of item identifiers, each of the item identifiers being selected at the user device.

11. The system of claim 10, wherein the in-memory cache stores mapping data that links access keys to respective combinations of promotion parameters.

12. The system of claim 9, wherein the item identifiers are associated with a group of items in the virtual shopping cart.

13. The system of claim 12, wherein the access key is based on a combination of promotion parameters received from a parameter device separate from the user device.

14. The system of claim 1, the steps further comprising:
receiving a mapping request from a source device, the mapping request comprising promotion parameters associated with the first item data;
generating, based on the mapping request, the access key and the first item data;
mapping the access key to the first item data; and
storing the first item data at the server or a database, the server being communicably connected to the database.

15. The system of claim 14, the steps further comprising:
generating, based on the mapping request, at least one additional access key and additional item data;
mapping the at least one additional access key to the additional item data; and
storing the additional item data at the server or a database.

16. The system of claim 15, wherein:
the mapping request comprises a plurality of promotion types;
the access key and item data are associated with a first promotion type; and
the additional access key and additional item data are associated with a second promotion type.

17. The system of claim 1, wherein the in-memory cache stores combinations of order request data satisfying different promotions, at least one of the promotions being associated with multiple combinations of order request data.

18. A computer-implemented method for dynamically caching mappings, comprising:
receiving, at an asynchronous queue from a user device, an access request to access first item data, the access request having an access key and being generated in response to an action (i) associated with a virtual shopping cart and (ii) taken by the user device;
based on the access key, routing the access request to a server having an in-memory cache with multiple partitions associated with different access key types, wherein:
the in-memory cache stores the first item data and second item data;
the multiple partitions are associated with different frequencies with which at least a portion of the first item data or second item data is replaced; and
the associated different access key types are associated with the different frequencies with which data associated with the access key types is replaced;
receiving, from the server, the first item data; and
transmitting the first item data to the user device.

19. A system for dynamically caching mappings, the system comprising:
a group of networked servers;
a computing device comprising:
at least one first processor; and
a non-transitory computer-readable medium containing a set of instructions that, when executed by the at least one processor, cause the at least one first processor to perform steps comprising:
receiving a mapping request from a remote source device, the mapping request comprising a reduction parameter associated with a price of a first item;
generating, based on the mapping request, the access key and first item data;
mapping the access key to the first item data;
receiving an access request to access first item data from a user device, the access request having an access key, the access key having an access key type, wherein the access request is generated in response to an action (i) associated with a virtual shopping cart and (ii) taken by the remote source device;
based on the access key, routing the access request to a load balancer;
receiving, from a server, the first item data; and
transmitting the first item data to the user device;
the load balancer comprising:
at least one second processor; and
a non-transitory computer-readable medium containing a set of instructions that, when executed by the at least one processor, cause the at least one second processor to perform steps comprising:
receiving, at an asynchronous queue within the system, the access request from the computing device; and
routing the access request to the server based on access request loads of the networked servers; and
the server comprising:
an in-memory cache with multiple partitions associated with different access key types, wherein:
the in-memory cache stores the first item data and second item data;
the in-memory cache stores mapping data that links access keys to respective combinations of promotion parameters;
the multiple partitions are associated with different frequencies with which at least a portion of the first item data or second item data is replaced; and
the associated different access key types are associated with the different frequencies with which data associated with the access key types is replaced;
at least one third processor; and
a non-transitory computer-readable medium containing a set of instructions that, when executed by the at least one processor, cause the at least one third processor to perform steps comprising:

receiving the access request from the load balancer;
determining a partition associated with the access key type of the access key; and
retrieving, from the partition and using the access key, the first item data, wherein the server is configured to remove at least one of the first or second item data in response to receiving third item data.

* * * * *